United States Patent [19]

Walters

[11] Patent Number: 5,087,010
[45] Date of Patent: Feb. 11, 1992

[54] SPEAKER'S PROMPTING PODIUM

[76] Inventor: Gregory M. Walters, 1706 Winding Ridge Trail, Knoxville, Tenn. 37922

[21] Appl. No.: 603,927

[22] Filed: Oct. 26, 1990

[51] Int. Cl.$^5$ .................................................. A47G 1/24
[52] U.S. Cl. ........................................ 248/455; 312/7.2
[58] Field of Search ............. 248/917, 918, 919, 923, 248/455, 441.1; 312/7.2, 20

[56] References Cited

U.S. PATENT DOCUMENTS

| | | | |
|---|---|---|---|
| 1,870,702 | 8/1932 | Zworykin | 312/20 X |
| 2,207,510 | 7/1940 | Flaherty et al. | 312/7.2 X |
| 2,494,364 | 1/1950 | Shaw | 312/7.2 |
| 2,604,536 | 7/1952 | Rose | 312/7.2 X |
| 2,839,344 | 6/1958 | Krantz et al. | 312/7.2 |
| 3,940,136 | 2/1976 | Runte | 248/917 X |
| 4,590,866 | 5/1986 | Schairbaum | 312/7.2 X |
| 4,842,402 | 6/1989 | Wise | 312/7.2 X |
| 4,861,121 | 8/1989 | Gotz | 312/7.2 X |
| 4,920,458 | 4/1990 | Jones | 312/7.2 X |

FOREIGN PATENT DOCUMENTS 2314690  1/1977  France ................. 248/917

*Primary Examiner*—J. Franklin Foss
*Attorney, Agent, or Firm*—Pitts and Brittian

[57] ABSTRACT

An improved speaker's prompting podium (10) for providing a speaker with a visual display for prompting notes, speech text, or other textual information. A video display monitor (38) is supported by at least one vertical support member (12), (14), and (16) in such a manner as to be visible to a speaker using such a podium (10). Electronic data input and processors (46) send the textual information to the display monitor (38) for selective viewing by a person standing behind such a podium (10).

18 Claims, 3 Drawing Sheets

SPEAKER'S PROMPTING PODIUM

DESCRIPTION

1. Technical Field

The device of the present invention relates to speaker's podiums in general and more particularly concerns a speaker's prompting podium having a video display screen for displaying textual data such as notes, speech text, last-minute situation updates, etc.

2. Background Art

Speaker's podiums have been known and used heretofore; however, the device of the present invention represents an improvement over the prior art which is intended to bring the art into the technological age.

Specifically, the device of the present invention embodies the use of state-of-the-art technology in communications to provide a video prompting mechanism as an integral part of a speaker's podium. In the past, such podiums have included lamps, clocks, and public address microphone stands and connectors, for example, as integral parts thereof. Prior to the present invention, however, there has been no such podium which included a provision for supplying video text prompting to a speaker using such podium.

It is envisioned within the scope of the present invention that even live feeds from commercial sources, such as Teletext, broadcast studios, wire services, or stock market news services, for instance, could be relayed to the herein described podium for viewing by a user thereof.

Such a device is seen as being sorely needed in a wide variety of applications, wherever public speaking is done.

Therefore, it is an object of the present invention to provide an improved podium for public speakers.

It is also an object of the present invention to provide such an improved speaker's podium having an electronic display monitor for the display of textual data such as notes, speech text, last-minute situation updates, live feeds, etc.

It is a further object of the present invention to provide such an improved speaker's podium which can include integral electronic data processing means.

It is another object of the present invention to provide such an improved speaker's podium with interface connections for external electronic signal input.

It is yet another object of the present invention to provide such an improved speaker's podium which can include a separate computer mounted or placed therewithin.

Still another object of the present invention is to provide a means whereby the internal components thereof may be secured to prevent unauthorized use.

DISCLOSURE OF THE INVENTION

In accordance with various features of the present invention, a speaker's podium, having upright support members which can be constructed of conventional materials, is provided. In a preferred embodiment, two side upright support members are joined to opposite sides of a front upright support member in any of several conventional manners, enclosing a substantially U-shaped area. The upright support members can be substantially rectangular in shape, although other forms and outlines can be just as functional. The edges thereof can be tapered, for instance, in order to present a more esthetic appearance. A first embodiment is contemplated for standing the podium of the present invention on a floor when in use. A second embodiment can be provided wherein the upright support members are of shorter construction than those of the first embodiment, enabling the podium of the second embodiment to be placed on a table, or other such horizontal support, for use. An alternate embodiment includes a door for securing internal components as required by the user. Of course, it will be seen by those skilled in the art that other embodiments of the present invention can include the use of only one or two upright support members, for instance, or more, as well as the version using three which is described in the preferred embodiment.

A support means for a video display monitor can be mounted to one or more of the uprights, preferably in a portion of the space enclosed by the upright support members. This monitor support can also serve to brace the upright support members in a substantially vertical plane. In a preferred embodiment, the monitor support means is mounted between the upright support members at a selected angle from the horizontal, the side distal from the speaker and proximate a front upright support being the raised side of the monitor support. Preferably, the display support means is attached to the upright support means at a position proximate the upper extremities of the upright support means. In this arrangement, an upper portion of the upright supports can serve as a containing member around the periphery of the monitor support means. Of course, it will be seen by those skilled in the art that such containing members can also be omitted or attached exteriorly and still remain within the scope and concept of the present invention.

A computer and/or discrete components of an electronic data processing means can be mounted or installed within the area enclosed by the supporting means. Electronic data can be coupled to the computer and/or the processing means by standard cables and interface connectors, as is well-known in the art. Subsequently, such data, in readable text form, can be displayed on the display monitor for viewing by a speaker standing at the podium.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
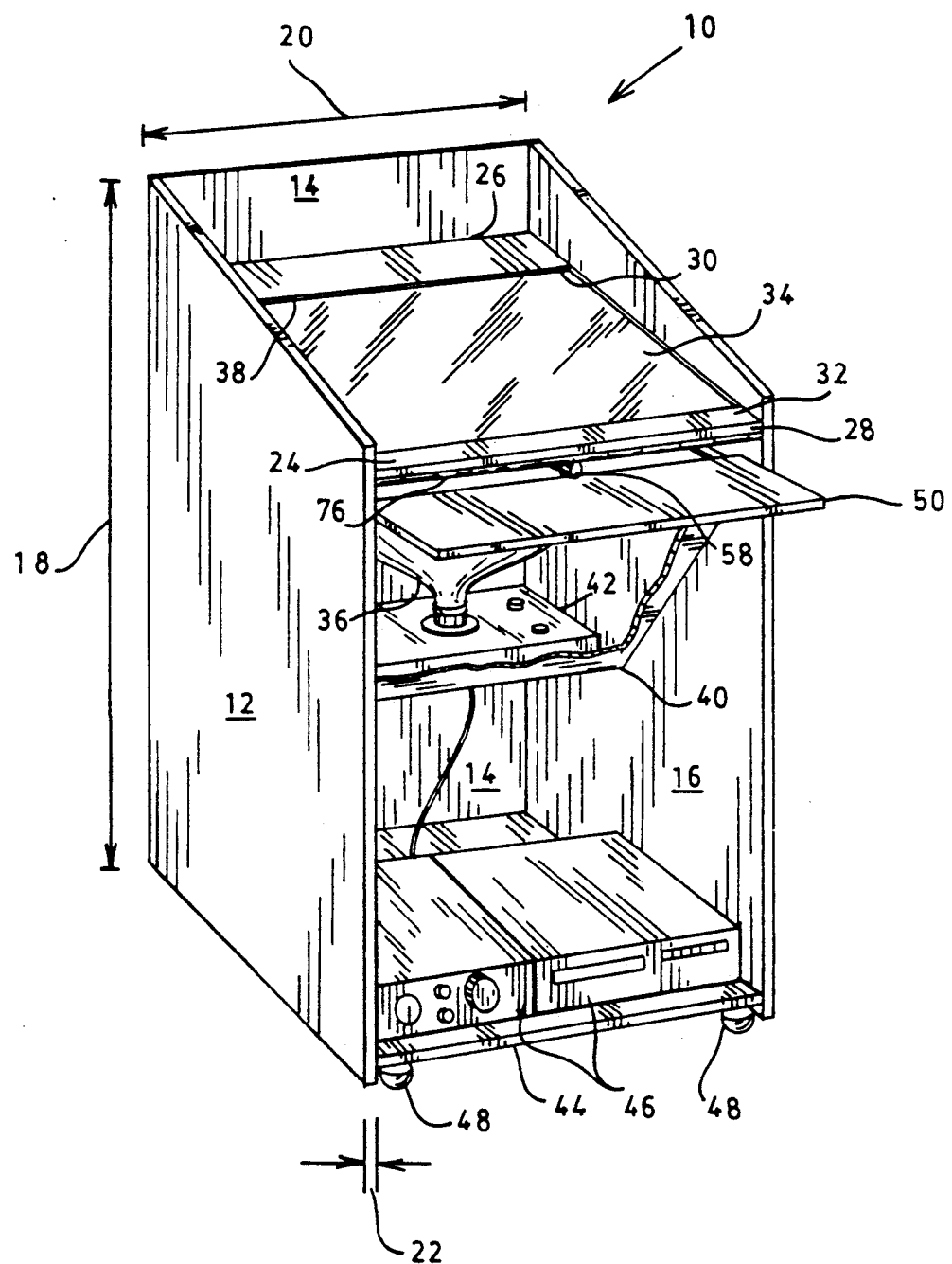
FIG. 1 is a perspective view, partially in section of the speaker's prompting podium constructed in accordance with several features of the present invention.

A speaker's prompting podium incorporating various features of the present invention is illustrated generally at 10 in the figures. The speaker's prompting podium 10 is designed for prompting a speaker by use of at least a video monitor 36 and preferably includes at least a left upright support 12, a center upright support 14, and a right upright support 16. Upright supports 12, 14, and 16 are preferably of a substantially rectangular outline, having a height 18, a width 20, and a thickness 22, all of which can be varied over a wide range of dimensions.

Figure 2:
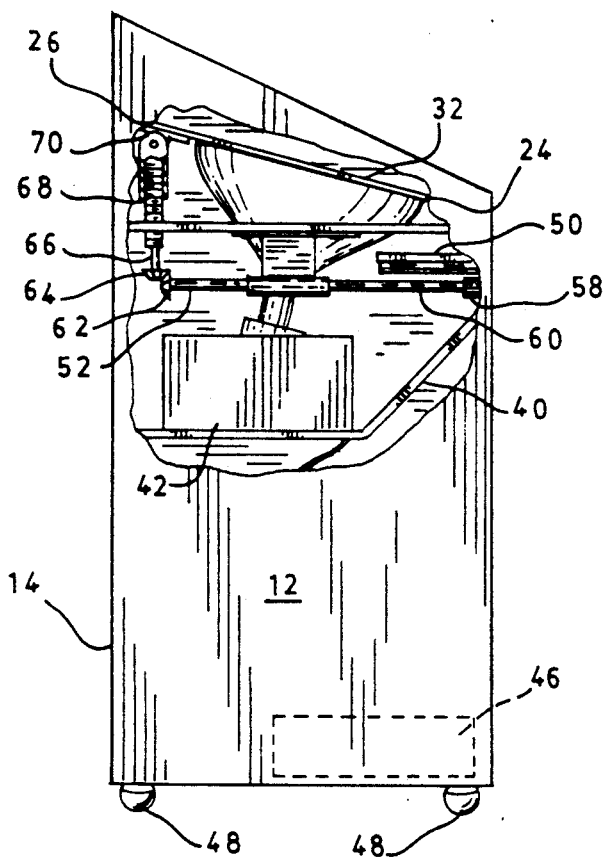
FIG. 2 is a side view, partially in section, of speaker's prompting podium of FIG. 1.
Figure 4:
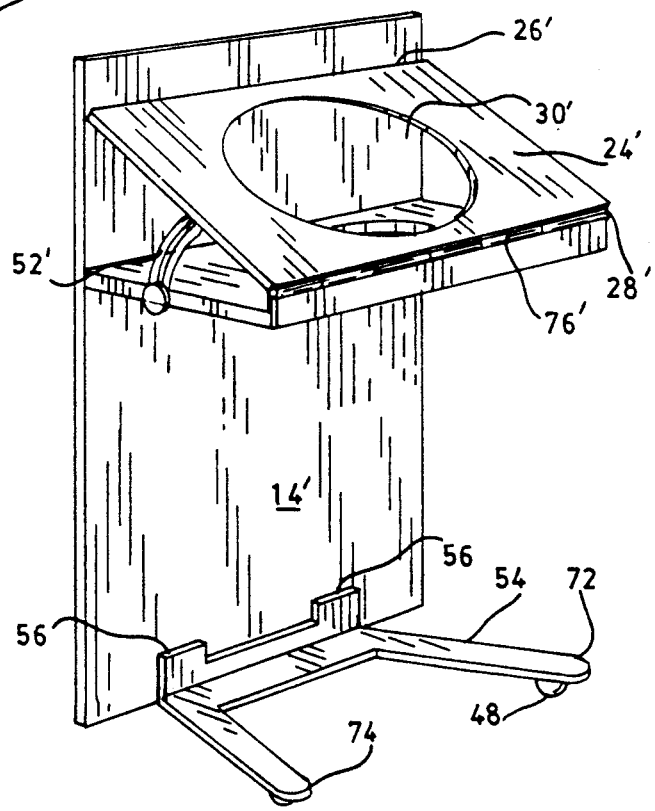
FIG. 4 is a drawing of one alternate embodiment of the present invention.

The upper extremity of side supports 12 and 16 can be tapered downwardly in a rearward direction, as illustrated, if desired. Further, upright supports 12, 14, and 16 can be constructed of any of a variety of materials, such as a plywood core with a veneer cover, for example. Metal and plastic (with or without decorations, simulations, or veneers) may also be used in constructing such a podium. Those skilled in the art will recognize that the depicted embodiment is only an exemplary one, and that the use of other materials and forms to construct such a podium remains well within the scope and disclosure of the present invention. For example, a single upright support (as illustrated in FIG. 4, wherein components corresponding to like components in FIGS. 1 and 2 are designated with primed like numerals) can be employed instead of the version using three uprights just described above. It is also still within the purview of the present invention to construct such a device with only two upright supports, or four, for example (not shown). Further, it will be seen that attachments and devices familiar in the art, such as microphone stands, cables, and connectors, etc., as well as lamps or clocks, for instance, can be attached to, or included as a part of, the device 10.

A support means 24 for a video display monitor 36 can be attached to any or all of the upright supports 12, 14, and 16 preferably within the space enclosed by such supports as illustrated in FIGS. 1 and 2. Monitor support 24 can be fixedly attached to one or more uprights through the use of fasteners suitable to the particular material of which the uprights are constructed. If a portable, quickly-disassembled version is envisioned, monitor support 24 can be attached through the use of quick-disconnect clips or fasteners, for instance.

In any embodiment, however, monitor support 24 can present a viewing screen 34 of a video display monitor 36 at an angle optimum for viewing by the user of the podium 10. In this regard, the providing of an adjustment means, such as the two styles depicted at 52 in FIG. 2 and 52' in FIG. 4, for instance, for adjusting the angle of monitor support 24, and thus, the angle of viewscreen 34, will be seen as being another feature of the present invention. A cathode ray tube (CRT) type of video display monitor 36 is illustrated in the figures. However, those skilled in the art will recognize that any of the various types of displays currently available in the art, and possibly even some not yet developed, could be utilized within the scope and definition of the present invention.

Angle adjuster 52 is comprised of a knob 58, for turning a shaft 60, which causes bevel gear 62 to rotate therewith, driving bevel gear 64 to turn shaft 66, thereupon rotating worm gear 68. A portion of worm gear 68 fits 5 threadably into a threaded receptacle 70 attached to monitor support 24, preferably at or near edge 26. Rotating knob 58 in one direction, as clockwise, for instance, causes worm gear 68 to drive monitor support 24 in an upward direction, thus changing the angle of monitor support 24 and viewscreen 34 from nearer the horizontal to nearer the vertical. Rotating knob 58 in the opposite direction (as CCW) reverses the procedure, returning monitor support 24, and thus, the angle, to nearer the horizontal. It will be recognized that a hinge or hinges) 76, 76' can accommodate the rotary movement of monitor support 24.

In a preferred embodiment, monitor support 24 is attached to uprights 12, 14, and 16 at a selected angle, with a front edge portion 26 being elevated above a rearward edge portion 28 in order to achieve such a selected angle. Angle adjuster 52 is operable to vary the amount of elevation by which edge 26 exceeds edge 28, thus determining the angle which viewscreen 34 presents to a speaker using the device 10. A portion 30 of the planar surface 32 of monitor support 24 is cut out so as to allow the viewing of a viewscreen 34 of a display monitor 36 installed therein. A trim strip or ferrule 38 or equivalent can be installed to cover the edge of opening 30. Further, a sheet of glass or other transparent material (not shown), such as plexiglas, for example, can be laid over or attached to substantially all of monitor support 24 in order to provide a single smooth surface for the writing on papers placed thereon. Angle adjuster 52 can be varied to suit the speaker who will be using the podium.

One or more additional shelves, one of which is illustrated at 40, can be added to the podium of the present invention. The shelf 40 can be placed so as to support and/or enclose the chassis portion 42 of display monitor 36. Other additional shelves, such as the one shown at 44, can support equipment such as a computer or electronic circuitry 46 which can be included as a portion of the device 10. A pull-out shelf 50 for use with a computer keyboard is shown pulled out in FIG. 1 and retracted in FIG. 2.

In an alternate embodiment, at least the vertical dimension 18 of uprights 12, 14, and 16 can be reduced to a size appropriate to the using of the device 10 placed on a banquet table or other intermediate support, in place of a self-supporting model resting on the floor.

Figure 3:
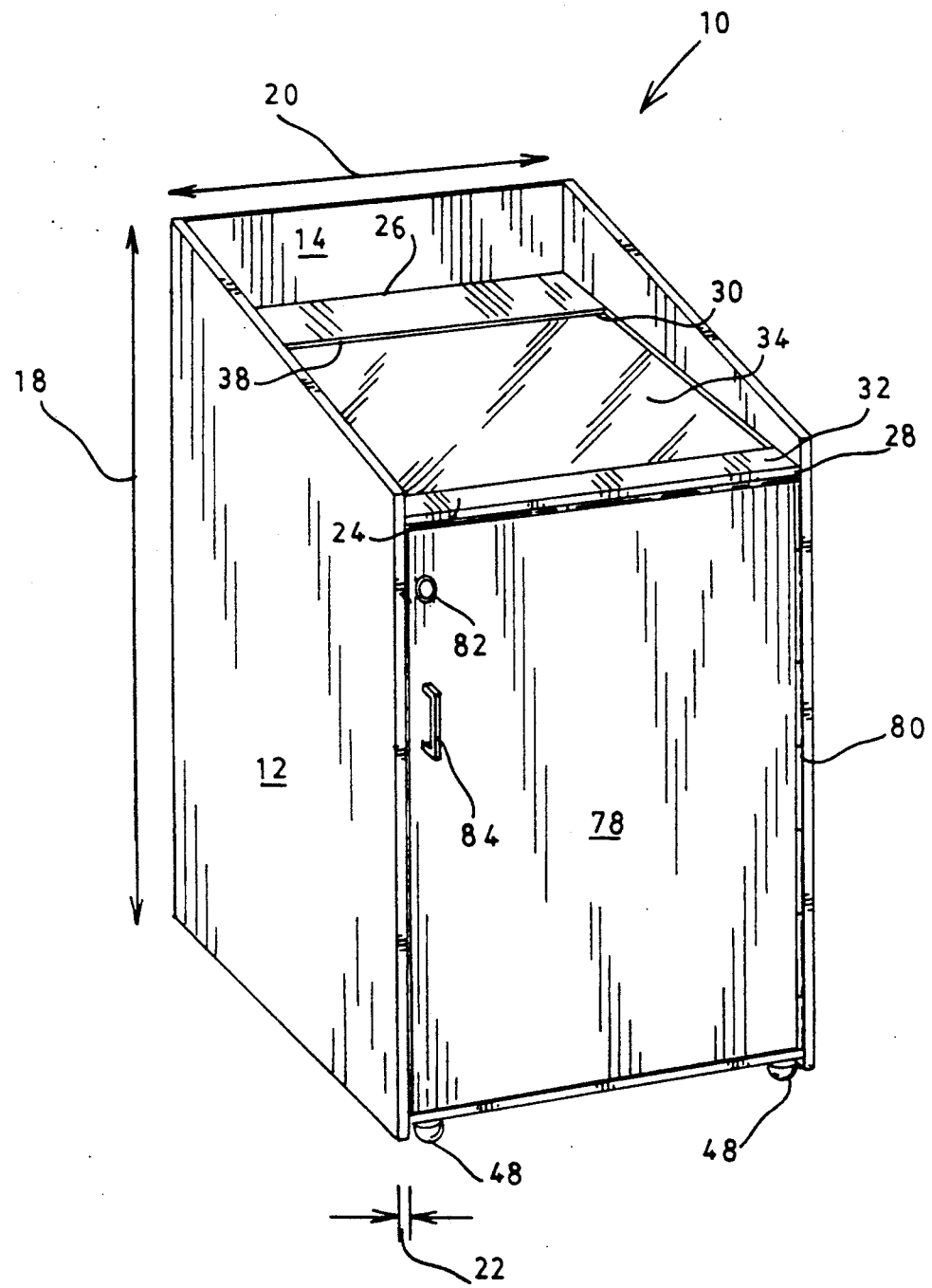
FIG. 3 is a perspective view of the speaker's prompting podium of FIG. 1 showing an optional door.

In another embodiment, a rear upright 78 is provided to be utilized as a door for securing the internal equipment of the prompting podium 10 as shown in FIG. 3. The door 78 is hingeably attached to either the left upright support 12 or the right upright support 16 as required by using at least one hinge 80. In the embodiment shown in FIG. 3, a piano type hinge is used at 80 such that a smoother swing and greater security is added, but conventional type hinges may also be employed. A locking device 82 is provided to prevent unauthorized entry. A handle 84 is also provided to aid the user in opening the door 78. In the embodiment shown, the lock 82 and handle 84 are located opposite the hinge 80, but could also be located proximate the top or bottom of the door 78.

In still another embodiment, illustrated in FIG. 4, a single upright support 14' is shown. Upright 14' is maintained in its substantially vertical orientation by skids 54. Two points of skids 54, 72 and 74, are shown in FIG. 4. A third point (not shown) could extend outwardly from the opposite side of upright 14' in order to prevent upright 14' from being toppled in that direction. Of course, it will be seen by those skilled in the art that upright 14' can be slanted toward points 72 and 74, far enough off the vertical, to avoid the need for a third point of skids 54. Skids 54 are attached to upright 14' by right angle braces 56 through the use of ordinary attaching hardware, which can be of the quick-disconnect clip type, nuts and bolts, or other suitable fasteners. Monitor support 24' can be attached to upright 14' in a similar manner as skids 54.

Wheels or rollers 48 can be provided for any embodiment of the device 10 of the present invention.

In use, a speaker would stand at the rear of the device 10, proximate the edge 28, substantially between uprights 12 and 16. Possibly having first adjusted the angle of the viewscreen 34 through the use of adjustment 52, 52', or equivalent for an optimum viewing angle, the speaker could begin to speak. As the speaker delivered his address, textual data, derived from electronic data processed through the computer or circuitry 46 and containing the body of the speech, prompts, or emphasis points, could be displayed on the viewscreen 34 of monitor 36. In this position, such textual data would be visible to only the speaker, or someone else occupying a position very near the speaker. Such a speaker could read such textual data directly from viewscreen 34, for instance, or could choose to only refer to viewscreen 34 from time to time to receive prompting or guidance, as desired. The speaker could speak without the benefit of audio amplification, or he could speak into a public address microphone built into the device of the present invention. Of course, circuitry and connections could also be included in the device 10 to provide for audio prompting, as a complement to the video prompting, preferably through a hearing aid type earphone for unobtrusiveness.

Thus, it will be seen that, regardless of the amount or complexity of peripheral hardware attached thereto, a podium for prompting a speaker, with or without the use of audio for prompting or public address, has been described. Such a podium can be provided for standing alone on a floor or for being supported on a table. A computer or integrally mounted electronic circuitry for conducting data to a video screen portion of the podium, as well as other adjunctive equipment, such as audio, for instance, can also be included as an integral part of the device. Such a device can also be provided in a portable, fold-up embodiment, as well as the fixed construction version herein described as a preferred embodiment.

While preferred embodiments of a device constructed in accordance with various features of the present invention have been described herein, the intent has not been to limit the device to such description. Rather, such description has been intended to embody all possible variations and alternate constructions falling within the spirit and scope of the invention as defined in the appended claims.

Accordingly, this invention is limited only by the claims appended hereto, and their equivalents, when taken in combination with the complete description contained herein.

I claim:

1. An improved speaker's podium including at least one upright support member and at least one bracing means for bracing said upright support member, said improved speaker's podium for supporting a video display monitor mounted therein, said improvement comprising:

at least one supplementary support member, supported by said upright support member, said supplementary support member for containing and supporting said video display monitor, having a viewscreen of said monitor positioned at a selectable angle such that said viewscreen is substantially perpendicular to a line of sight of a user facing said viewscreen, said user being positioned proximate to said improved speaker's podium such that said viewscreen is substantially exclusively visible to said user and substantially invisible to an audience to which said user is speaking; and framing means for forming a work surface proximate said monitor viewscreen which provides a user with a surface upon which to place papers, speech notes, or the like, and allows said user to view at least a portion of said viewscreen while positioned proximate said podium.

2. The improved speaker's podium of claim 1 wherein said improvement further comprises electronic data input and processing means whereby electronic data is processed and coupled to said display monitor for viewing in textual form by a user of said podium.

3. The improved speaker's podium of claim 1 wherein said work surface is peripheral to said viewscreen and substantially co-planar with said selectable angle.

4. The improved speaker's podium of claim 1 wherein said bracing means includes at least one member defining a substantially horizontal planar top surface, said bracing means for relatively fixing said upright support members and supporting said electronic data input and processing means.

5. The improved speaker's podium of claim 2 wherein said electronic data input and processing means includes a computer.

6. The improved speaker's podium of claim 5 wherein said improvement further comprises a support means for supporting a data entry keyboard.

7. The improved speaker's podium of claim 1 wherein four substantially upright support members are utilized including a back substantially upright support member.

8. The improved speaker's podium of claim 7 wherein said back substantially upright support member includes a door member.

9. The improved speaker's podium of claim 1 wherein said improvement further comprises wheel means attached thereto proximate a bottom end of said upright support member for ease of mobility.

10. An improved speaker's prompting podium including at least one upright support member and at least one bracing means for bracing said upright support member, said improved speaker's podium for supporting a video display monitor and electronic data input and processing means for displaying on said display monitor data processed into textual video, said textual video being visible to a speaker standing at said podium, said improvement comprising:

at least one supplementary support member, supported by said upright support member, said supplementary support member for containing and supporting said video display monitor, having a viewscreen of said monitor positioned at a selectable angle such that said viewscreen is substantially perpendicular to a line of sight of a user facing said viewscreen, said user being positioned proximate to said improved speaker's podium such that said viewscreen is substantially exclusively visible to said user and substantially invisible to an audience to which said user is speaking;

framing means attached to said supplementary support member for providing a support surface peripheral to and substantially co-planar with said viewscreen of said display monitor for placement of papers, notes and similar material of said user; and overlayment means for overlaying said viewscreen and at least a portion of said framing means for forming a work surface, said overlayment means having at least a portion thereof transparent, said transparent portion being substantially in register with said viewscreen.

11. The improved speaker's prompting podium of claim 10 wherein said improvement further comprises an adjustment means for selectively adjusting said selectable angle of said viewscreen.

12. The improved speaker's prompting podium of claim 10 wherein said bracing means includes at least one member defining a substantially horizontal planar top surface, said bracing means for relatively fixing said upright support members and supporting said electronic data input and processing means.

13. The improvement speaker's prompting podium of claim 10 wherein said electronic data input and processing means includes a computer.

14. The improved speaker's prompting podium of claim 13 wherein said improvement further comprises a support means for supporting a data entry keyboard.

15. The improved speaker's prompting podium of claim 10 wherein four substantially upright support members are utilized, including a back substantially upright support member.

16. The improved speaker's prompting podium of claim 15 wherein said back substantially upright support member includes a door member.

17. The improved speaker's prompting podium of claim 10 wherein said improvement further comprises wheel means attached thereto proximate a bottom end of said upright support member for ease of mobility.

18. An improved speaker's prompting podium including at least one upright support member and at least one bracing means for bracing said upright support member, said improved speaker's podium for supporting a video display monitor and electronic data input and processing means for displaying on said display monitor data processed into textual video, said textual video being visible to a speaker standing at said podium, said improvement comprising:

at least one supplementary support member, supported by said upright support member, said supplementary support member for containing and supporting said video display monitor, having a viewscreen of said monitor positioned at a selectable angle such that said viewscreen is substantially perpendicular to a line of sight of a user facing said viewscreen, said user being positioned proximate to said improved speaker's podium such that said viewscreen is substantially exclusively visible to said user and substantially invisible to an audience to which said user is speaking;

framing means attached to said supplementary support member for providing a support surface peripheral to and substantially co-planar with said viewscreen of said display monitor for placement of papers, notes and similar material of said user;

overlayment means for overlaying said viewscreen and at least a portion of said framing means of forming a work surface, said overlayment means having at least a portion thereof transparent, said transparent portion being substantially in register with said viewscreen;

an adjustment means for exclusively adjusting said selectable angle of said viewscreen; and wherein said bracing means includes at least one member defining a substantially horizontal planar top surface, said bracing means for relatively fixing said upright support members and supporting said electronic data input and processing means.

* * * * *